(12) United States Patent
Jurek et al.

(10) Patent No.: US 10,608,480 B2
(45) Date of Patent: Mar. 31, 2020

(54) DEVICE FOR INDUCTIVELY CHARGING A PIECE OF USER EQUIPMENT, INTENDED FOR A MOTOR VEHICLE

(71) Applicants: Continental Automotive France, Toulouse (FR); Continental Automotive GmbH, Hannover (DE)

(72) Inventors: Gilles Jurek, Plaisance du Touch (FR); Youri Vassilieff, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/341,638

(22) PCT Filed: Nov. 28, 2017

(86) PCT No.: PCT/FR2017/053273
§ 371 (c)(1),
(2) Date: Apr. 12, 2019

(87) PCT Pub. No.: WO2018/100284
PCT Pub. Date: Jun. 7, 2018

(65) Prior Publication Data
US 2019/0386524 A1    Dec. 19, 2019

(30) Foreign Application Priority Data

Nov. 29, 2016 (FR) ...................................... 16 61639

(51) Int. Cl.
*H02J 7/00*    (2006.01)
*H02J 50/90*   (2016.01)
(Continued)

(52) U.S. Cl.
CPC .............. *H02J 50/90* (2016.02); *B60R 16/03* (2013.01); *H02J 7/0042* (2013.01); *H02J 7/025* (2013.01); *H02J 50/10* (2016.02)

(58) Field of Classification Search
USPC ......................................................... 320/108
See application file for complete search history.

(56) References Cited

U.S. PATENT DOCUMENTS 8,305,036 B2 * 11/2012 Toya ..................... H02J 7/0045
                                                          320/108
9,520,225 B2 * 12/2016 Waffenschmidt ... H01F 27/2804
(Continued)

OTHER PUBLICATIONS

International Search Report and Written Opinion for International Application No. PCT/FR2017/053273, dated Feb. 26, 2018—8 pages.
(Continued)

*Primary Examiner* — Samuel Berhanu
(74) *Attorney, Agent, or Firm* — RatnerPrestia

(57) ABSTRACT

A device for wirelessly charging an item of user equipment, intended to be installed in a motor vehicle. The device includes a housing delimiting an inner space, having a frame on which there is installed a support intended to receive an item of user equipment able to be recharged through wireless energy transmission. The device includes a wireless charging module installed in the inner space of the housing, having a circuit board on which there is installed a single transmitter coil configured so as to transmit an electromagnetic field for wirelessly charging the item of user equipment, it includes a rack mechanism able to be actuated by a user so as to move the transmitter coil along the support to a wireless charging position of the item of user equipment.

8 Claims, 3 Drawing Sheets

(51) Int. Cl.
*H02J 50/10* (2016.01)
*B60R 16/03* (2006.01)
*H02J 7/02* (2016.01)

(56) References Cited

U.S. PATENT DOCUMENTS

| | | | |
|---|---|---|---|
| 2010/0315039 A1* | 12/2010 | Terao | H01F 38/14 320/108 |
| 2012/0146579 A1* | 6/2012 | Shukuya | G12B 5/00 320/108 |
| 2012/0313576 A1* | 12/2012 | Peiker | H02J 7/0044 320/108 |
| 2012/0326659 A1* | 12/2012 | Shukuya | H02J 7/0044 320/108 |
| 2014/0176057 A1 | 6/2014 | Van Wiemeersch | |
| 2015/0097523 A1 | 4/2015 | Abdelaziz | |
| 2016/0079782 A1* | 3/2016 | Tojo | H02J 5/005 320/108 |

OTHER PUBLICATIONS

English Translation of the Written Opinion for International Application No. PCT/FR2017/053273, dated Feb. 26, 2018, 6 pages.

* cited by examiner

DEVICE FOR INDUCTIVELY CHARGING A PIECE OF USER EQUIPMENT, INTENDED FOR A MOTOR VEHICLE

CROSS REFERENCE TO RELATED APPLICATIONS

This application is the U.S. National Phase Application of PCT International Application No. PCT/FR2017/053273, filed Nov. 28, 2017 which claims priority to French Patent Application No. 1661639, filed Nov. 29, 2016, the contents of such applications being incorporated by reference herein.

FIELD OF THE INVENTION

The present invention pertains to the automotive sector and relates more particularly to a device for inductively charging a battery of an item of user equipment and to a motor vehicle comprising such a device.

BACKGROUND OF THE INVENTION

Numerous motor vehicles nowadays include a charging module for recharging the battery of a mobile telephone.

This charger may comprise a connector to which the telephone is connected or else a surface on which the telephone is placed in order for it to be inductively recharged.

In the latter solution, the inductive charging device comprises at least one transmitter antenna and the telephone comprises a receiver antenna taking the form of a coil positioned substantially in the center of the telephone, in particular in order to allow good balancing thereof, as prescribed for example in the WPC ("Wireless Power Consortium") standard.

To perform inductive coupling for effectively recharging the battery of the telephone, it is necessary to substantially align the center of the receiver antenna thereof with the center of one of the antennas of the device, with a tolerance of the order of 10 mm.

Therefore, it is necessary for the device to have a plurality of antennas when it is desired to cover a large charging surface, thereby making the device complex and expensive. In the opposite case, it is necessary to move the telephone in order to align its receiver antenna with the transmitter antenna of the device, thereby exhibiting a major drawback.

In all cases, when the vehicle moves, the mobile telephone may be subject to numerous movements, and the driver then has to constantly realign the telephone with the transmitter antenna while driving, which may prove dangerous, and therefore exhibits a major drawback.

One known solution for solving this drawback consists in using a charging device whose transmitter antenna or antennas are motorized so as to move in order to increase the charging surface and no longer have to manually align the telephone with the transmitter antenna. Such a solution is extremely complex and expensive, thereby exhibiting a significant drawback, in particular for entry-level vehicles. In addition, such a motorized charging device is not necessarily suitable for a wide range of telephone sizes, thereby exhibiting a major drawback.

SUMMARY OF THE INVENTION

An aspect of the invention is a recharging solution that is simultaneously simple, reliable, effective and inexpensive.

To this end, an aspect of the invention relates first of all to a device for wirelessly charging an item of user equipment, intended to be installed in a motor vehicle, said device comprising a housing delimiting an inner space, said housing comprising a frame on which there is installed a support intended to receive an item of user equipment able to be recharged through wireless energy transmission, said device comprising a wireless charging module installed in the inner space of the housing and being noteworthy in that said charging module comprises a circuit board on which there is installed a single transmitter coil configured so as to transmit an electromagnetic field for wirelessly charging the item of user equipment, and in that it comprises a rack mechanism able to be actuated by a user so as to move said transmitter coil along the support to a wireless charging position of said item of user equipment.

Such a rack mechanism allows easy use of the device by the user, in particular when he is driving the vehicle, thereby increasing the safety of the vehicle.

The wireless charging device is preferably an inductive charging device, that is to say using inductive coupling, such a device being easy to implement and inexpensive.

In another embodiment, the wireless charging device is a magnetic resonance charging device whose range is larger than that of an inductive charging device.

The rack mechanism preferably comprises a locking bar installed on the support so as to slide along a sliding axis and connected rigidly to a toothed straight portion engaging with a toothed circular portion able to drive the circuit board, said locking bar being able to be actuated by a user so as to move the circuit board parallel to the sliding axis of the locking bar so that the transmitter coil faces the item of user equipment when the latter is locked against the frame by the locking bar.

Such a mechanism is easy to implement and inexpensive, thereby making it effective and attractive for any type of vehicle.

Preferably again, the ratio between the length of translational movement of the transmitter coil and the sliding length of the locking bar is half. Such a ratio advantageously makes it possible to bring the transmitter coil to face the center of the item of user equipment, where the wireless charging receiver coil is situated.

Advantageously, the surface of the support is suitable for the sliding of the item of user equipment so as to facilitate the movement, by the mechanism, of the item of user equipment on the support.

Advantageously again, the device furthermore comprises means for guiding the circuit board, making it possible to make the mechanism both robust and easy to use.

An aspect of the invention also relates to an assembly formed of a charging device as claimed in one of the preceding features and an item of user equipment positioned on the support of the wireless charging device.

According to one aspect of the invention, the item of user equipment is held between the frame and the locking bar facing the transmitter coil.

An aspect of the invention also relates to a motor vehicle comprising a wireless charging device such as presented above.

An aspect of the invention also relates to an assembly formed of a motor vehicle such as presented above and an item of user equipment positioned on the support of the wireless charging device.

An aspect of the invention relates lastly to a method for aligning an item of user equipment, placed on a support installed in a motor vehicle, with a transmitter coil for wirelessly charging said item of user equipment positioned underneath said support, said method being noteworthy in that it comprises a step of actuation of a rack mechanism by a user so as to bring the item of user equipment and the transmitter coil to face one another through the support so as to allow the wireless charging of the item of user equipment.

Preferably, with the support being installed on a frame, the actuation step comprises a sub-step of moving a locking bar joined to a toothed portion rotationally driving a toothed wheel joined to the transmitter coil until the transmitter coil and the item of user equipment are facing one another and said locking bar simultaneously holds the item of, user equipment against the frame.

Advantageously, the method furthermore comprises a step of aligning the longitudinal axis of the item of user equipment and the sliding axis of the locking bar.

The method preferably comprises a step of wirelessly charging the item of user equipment through the transmitter coil.

In one embodiment, wireless charging is performed through induction or inductive coupling.

In another embodiment, wireless charging is performed through magnetic resonance.

BRIEF DESCRIPTION OF THE DRAWINGS

Other features and advantages of aspects of the invention will emerge during the following description, given with reference to the appended figures, which are given by way of non-limiting example and in which identical references are given to similar objects.

DETAILED DESCRIPTION OF THE PREFERRED EMBODIMENTS

The device according to an aspect of the invention is intended to be installed in a motor vehicle, for example on the central console or the central armrest between the driver's seat and the front passenger seat, so as to charge the battery of an item of user equipment through wireless energy transmission.

By way of example, such an item of user equipment may be a mobile telephone of smartphone type, a tablet, a connected object or any other suitable object able to be recharged wirelessly, preferably of substantially rectangular shape.

An inductive recharging device will be presented hereinafter, but it will be noted that the recharging device could also be a magnetic resonance recharging device.

Figure 1:
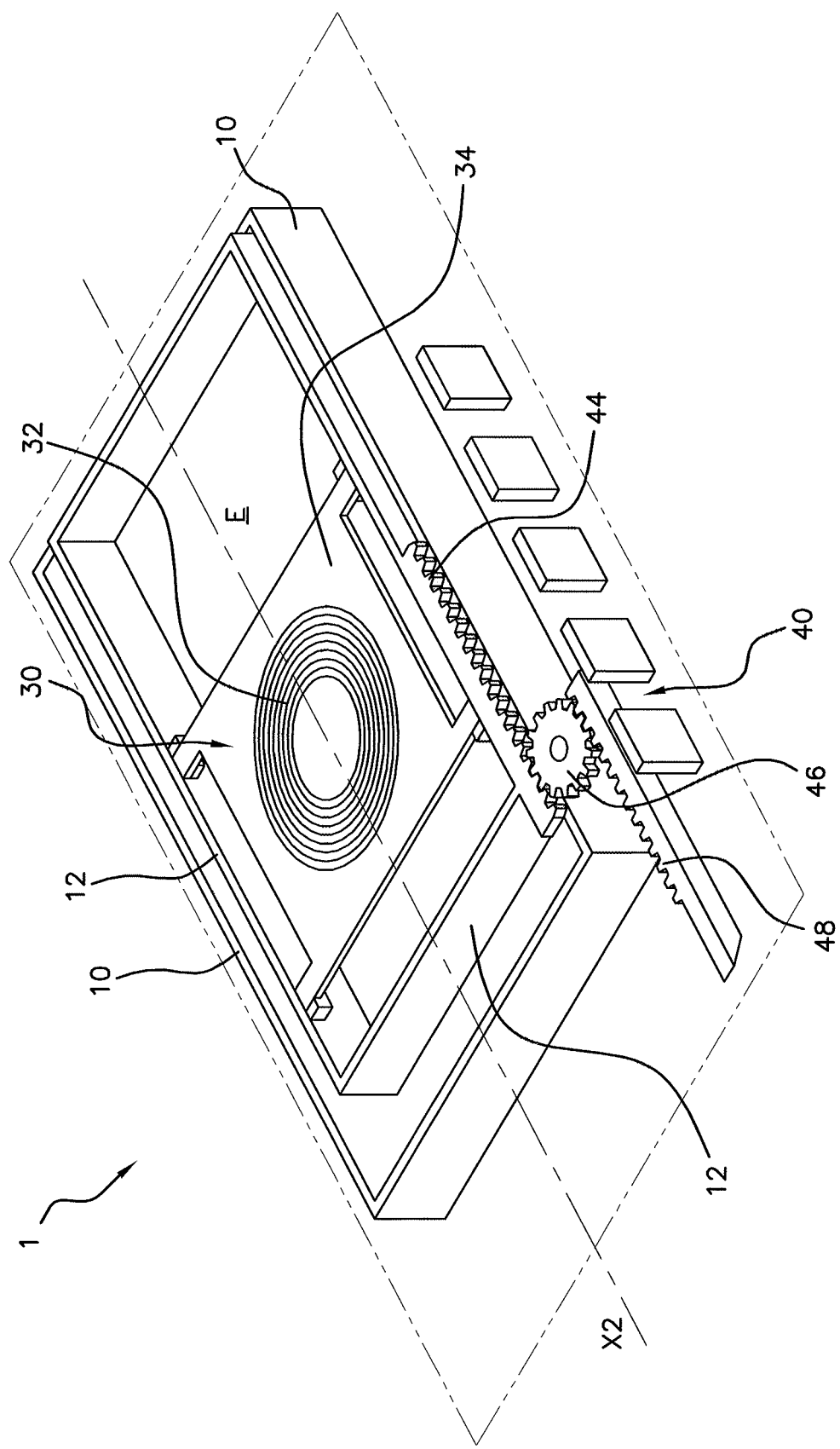
FIG. 1 schematically illustrates, partly transparently, a first embodiment of the device according to an aspect of the invention.
Figure 2:
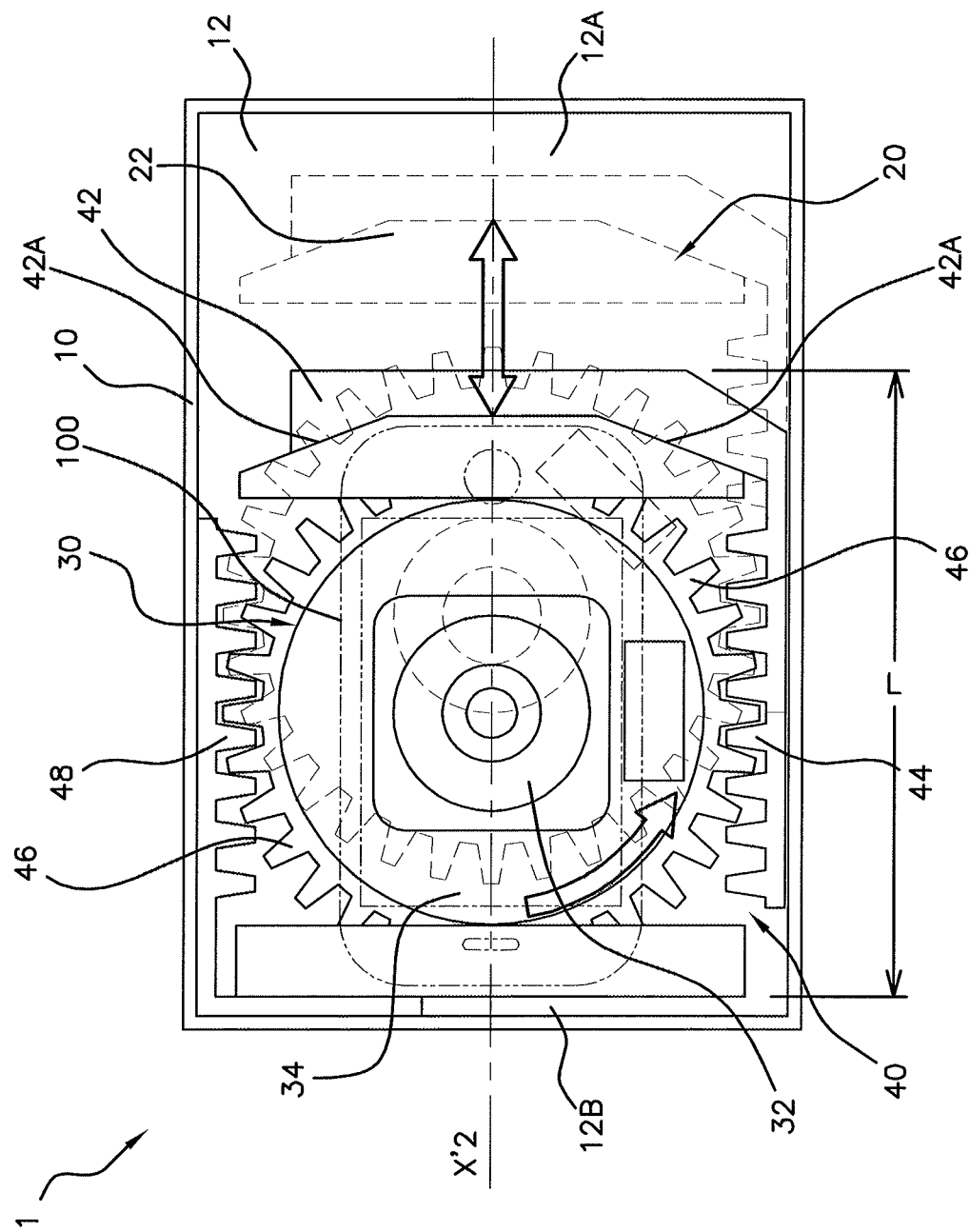
FIG. 2 schematically illustrates, partly transparently, a second embodiment of the device according to an aspect of the invention.

FIGS. 1 and 2 show two embodiments of the device according to an aspect of the invention. These two embodiments differ in terms of appearance and the size of the elements, but have the same essential technical features. As a result, they will be described simultaneously below.

The device 1 comprises a housing 10, a support 20 (absent in FIG. 1 for the sake of clarity), a charging module 30 and a rack mechanism 40.

The housing 10 may be fully or partly integral with an element of the vehicle, such as for example an armrest or a console. This housing 10 is installed fixedly in the vehicle and comprises a frame 12 that delimits an inner space E for receiving the charging module 30 and the rack mechanism 40.

The support 20 is installed on the frame 12 and is designed to receive an item of user equipment 100 extending along a longitudinal axis X1 (with reference to FIG. 3) so that the charging module 30 electrically recharges its battery (not shown) through induction. To this end, the item of user equipment 100 comprises, positioned substantially at its center, an inductive charging receiver coil (not shown).

The support 20 comprises an upper surface 22 designed to allow the item of user equipment 100 to slide when it is placed on said surface 22. To this end and by way of example, this surface 22 may be made of a plastic material and preferably have a length of between 10 and 20 cm and a width of between 10 and 15 cm.

The charging module 30 is configured so as to transmit an electromagnetic field for inductively recharging the item of user equipment 100.

To this end, the charging module 30 in this example comprises a transmitter coil 32 and an electronic unit for driving said transmitter coil 32 (not shown and known per se) that are installed in the reception space E of the housing 10.

In this nonlimiting example, the transmitter coil 32 is installed on a printed circuit in the form of a circuit board 34, which may for example be rectangular as in the example of FIG. 1 or circular as in the example of FIG. 2 or any other suitable shape. As the transmitter coil 32, the receiver coil and inductive charging are known per se, they will not be described in further detail here.

According to an aspect of the invention, the rack mechanism 40 makes it possible to move the transmitter coil 32 and the item of user equipment 100 so that they come to face one another so as to allow the battery of the item of user equipment 100 to be charged by the transmitter coil 32.

To this end, the rack mechanism 40 first of all comprises a locking bar 42 for locking the item of user equipment 100. This locking bar 42 is installed on the support 20 so as to slide along a sliding axis X2 and is able to be actuated by a user so as to move and lock the item of user equipment 100 on the surface 22 of the support 20.

Figure 3:
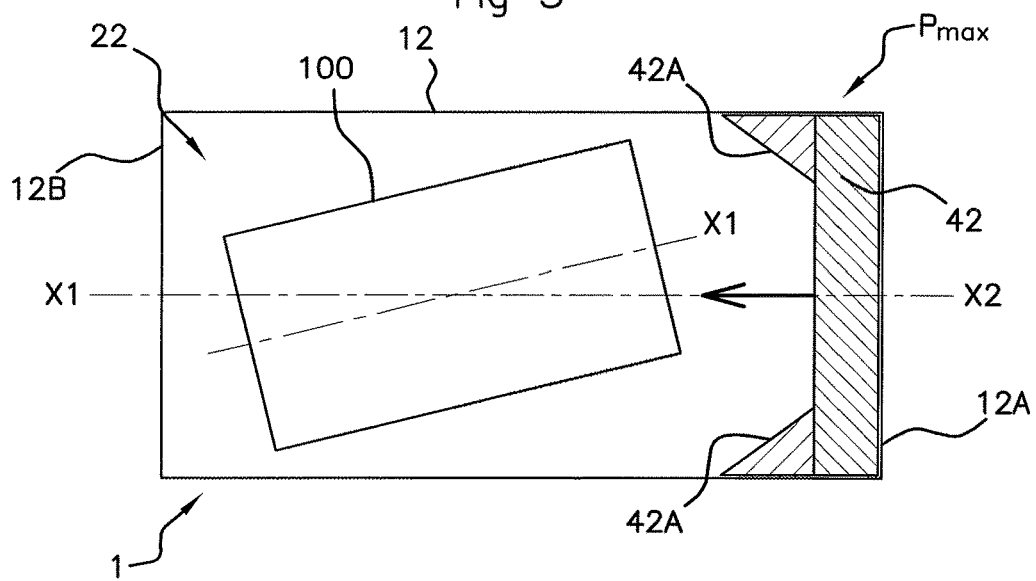
FIG. 3 schematically illustrates the maximum position of one embodiment of the device.
Figure 4:
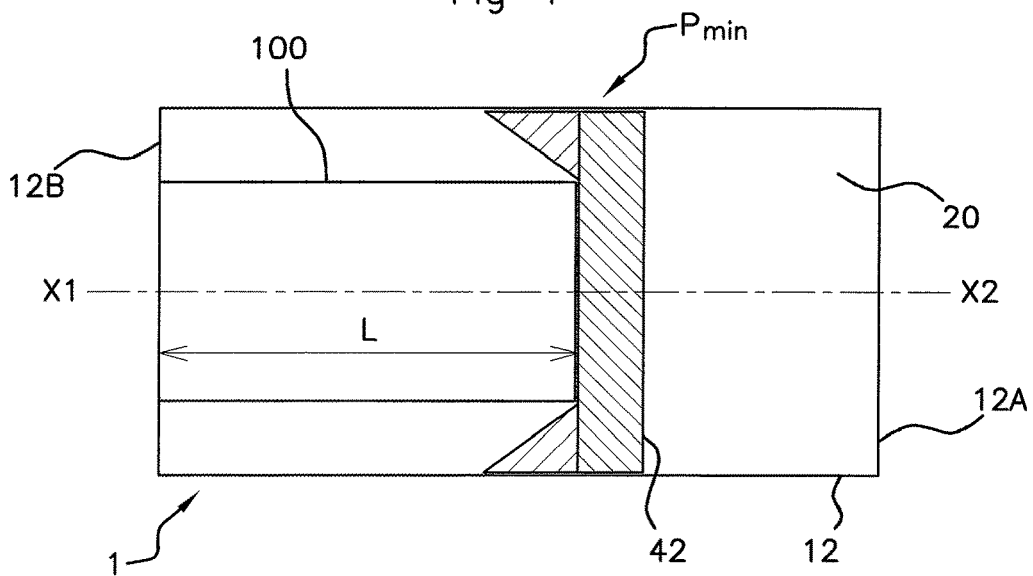
FIG. 4 schematically illustrates the minimum position corresponding to the embodiment of the device of FIG. 3.

The locking bar 42 is able to slide between a position of maximum opening $P_{MAX}$, illustrated in FIG. 3, in which it is pressed against a first edge 12A of the frame 12, and a position of minimum opening $P_{MIN}$, illustrated in FIG. 4, which depends on the size of the item of user equipment 100 and in which the locking bar 42 is pressed against the item of user equipment 100, which is itself pressed against a second edge 12B, opposite the first edge 12A, of the frame 12.

The travel of the locking bar 42 between the position of maximum opening $P_{MAX}$ and the position of minimum opening $P_{MIN}$ may be a few tens of millimeters, preferably between 20 and 150 mm. The useful length L is defined as being the distance between the second edge 12B of the frame 12 and the locking bar 42 in the position of minimum opening $P_{MIN}$ of the locking bar 42 (i.e. when an item of user equipment 100 is positioned on the support 20 in the position of minimum opening $P_{MIN}$), this useful length L corresponding to the length (or the width where appropriate) of the item of user equipment 100.

To allow sufficient alignment of the item of user equipment 100 with the transmitter coil 32, the locking bar 42 has, at its ends, two beveled portions 42A designed to come into contact with the corners of the item of user equipment 100 so as to keep it centered on the support 20 and facing the transmitter coil 32 in the position of minimum opening $P_{MIN}$.

The rack mechanism 40 then comprises a toothed straight portion 44 and a toothed circular portion 46 that are installed in the inner space E and configured so as to move the transmitter coil 32 in translation when a user actuates the locking bar 42 as far as a position of minimum opening $P_{MIN}$ in which, simultaneously, the locking bar 42 locks the item of user equipment 100 against the first edge 12A of the frame 12 and the charging module 30 and the item of user equipment 100 are facing one another.

The toothed straight portion 44 is connected rigidly to the locking bar 42 so as to drive the toothed circular portion 46 in translation.

In the example of FIG. 1, the toothed circular portion 46 is a toothed wheel installed on a vertical shaft joined to the housing 10 so as to be engaged with the toothed straight portion 44.

In the example of FIG. 2, the toothed circular portion 46 is a toothed wheel installed on the circuit board 34, on the one hand, and engaging with the toothed straight portion 44, on the other hand, so as to drive the transmitter coil 32 in rotation with the circuit board 34 when the toothed wheel is driven in translation by the toothed straight portion 44.

The number and the size of the teeth and the dimensions of the toothed straight portion 44 and of the toothed circular portion 46 are chosen such that the movement of the locking bar 42 between its position of maximum opening $P_{MAX}$ and a position of minimum opening $P_{MIN}$ drives a translational movement of the circuit board 34 by a length equal to half the movement distance of the locking bar 42.

In the embodiment illustrated in FIG. 2, this drives a rotation of the transmitter coil 32 by about one quarter-turn (i.e. of the order of 90°), thereby making it possible in particular to authorize inductive charging of the battery of an item of user equipment 100 for a plurality of useful lengths between for example 100 and 200 mm.

To increase the robustness and the effectiveness of the mechanism 40, the device 1 comprises means for guiding the circuit board 34. In the example of FIG. 2, these guide means take the form of a second toothed straight portion 48 fixed to the frame 12 of the housing 10. As a variant, these guide means could also take the form of a guide rail or any other suitable means.

Figure 5:
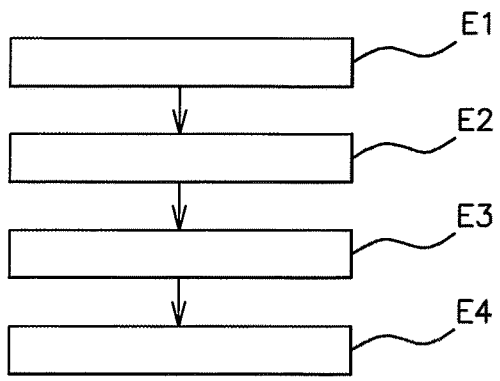
FIG. 5 illustrates an embodiment of the method according to an aspect of the invention.

An aspect of the invention will now be described in terms of the implementation thereof with reference to FIGS. 3 to 5.

In the following nonlimiting example, the diameter of the transmitter coil 32 is between 80 and 100 mm and the travel of the locking bar 42 is of the order of 60 mm.

First of all, when a user wishes to charge the battery of his item of equipment 100, he positions it on the surface 22 of the support 20 in a step E1. To this end, he may firstly need to slide the bar 42 to its position of maximum opening $P_{MAX}$ in order to free up enough space to place the item of user equipment 100.

The user then actuates the locking bar 42 in a step E2 so that it comes into contact with the item of user equipment 100 and makes it slide on the surface 22 of the support 20.

In doing this, the locking bar 42 drives the first toothed portion 44 in translation, which in turn drives the toothed circular portion 46 so as to move the transmitter coil 32 until the item of user equipment 100 bears on the second edge 12B of the frame 12 in the position of minimum opening $P_{MIN}$ of the locking bar 42 in which the transmitter coil 32 is facing the receiver coil of the item of user equipment 100.

During this movement, the transmitter coil 32 advantageously moves in translation by a distance equal to half the distance over which the locking bar 42 moves along the sliding axis X2, so as to ensure that the transmitter coil 32 and the receiver coil of the item of user equipment 100 are facing one another, and thus allow the item of user equipment 100 to be charged.

During the movement, the beveled portions 42A of the locking bar 42 make it possible to align, in a step E3, the longitudinal axis X1 of the item of user equipment 100 with the sliding axis X2 of the locking bar 42, so as to improve the quality of the inductive charging.

In a step E4, the transmitter coil 32 inductively charges the battery of the item of user equipment 100 via the receiver coil.

The device according to an aspect of the invention therefore advantageously makes it possible to easily and quickly position an item of user equipment 100 on an inductive charging support just by actuating the locking bar 42. In addition, the device does not require a motor to operate, thereby making it less expensive than a motorized device.

The invention claimed is:

1. A device for wirelessly charging an item of user equipment, intended to be installed in a motor vehicle, said device comprising: a housing delimiting an inner space, said housing comprising a frame on which there is installed a support intended to receive an item of user equipment able to be recharged through wireless energy transmission, a wireless charging module installed in the inner space of the housing, said charging module comprising:
   a circuit board on which there is installed a single transmitter coil configured so as to transmit an electromagnetic field for wirelessly charging the item of user equipment and
   a rack mechanism able to be actuated by a user so as to move said transmitter coil along the support to a wireless charging position of said item of user equipment, the rack mechanism comprising a locking bar installed on the support so as to slide along a sliding axis and connected rigidly to a toothed straight portion engaging with a toothed circular portion able to drive the circuit board, said locking bar being able to be actuated by a user so as to move the circuit board parallel to the sliding axis of the locking bar so that the transmitter coil faces the item of user equipment when the latter is locked against the frame by the locking bar.

2. The device as claimed in claim 1, wherein a ratio between the length of translational movement of the transmitter coil and a sliding length of the locking bar is half.

3. The device as claimed in claim 1, wherein the surface of the support is suitable for the sliding of the item of user equipment.

4. The device as claimed in claim 1, furthermore comprising a guide for the circuit board.

5. An assembly formed of a charging device as claimed in claim 1 and an item of user equipment positioned on the support of the wireless charging device.

6. A motor vehicle, comprising a wireless charging device as claimed in claim 1.

7. A method for aligning an item of user equipment, placed on a support installed in a motor vehicle, with a transmitter coil for wirelessly charging said item of user equipment positioned underneath said support, said method comprising actuation of a rack mechanism by a user so as to bring the item of user equipment and the transmitter coil to face one another through the support so as to allow the wireless charging of the item of user equipment, wherein with the support being installed on a frame, the actuation comprises moving a locking bar joined to a toothed portion rotationally driving a toothed wheel joined to the transmitter coil until the transmitter coil and the item of user equipment are facing one another and said locking bar simultaneously holds the item of user equipment against the frame.

8. The method as claimed in claim 7, furthermore comprising a step of aligning the longitudinal axis ($X1$) of the item of user equipment and the sliding axis of the locking bar.

* * * * *